Nov. 15, 1932.  E. ALTENKIRCH  1,887,909
ABSORPTION MACHINE
Original Filed June 8, 1929  2 Sheets-Sheet 2
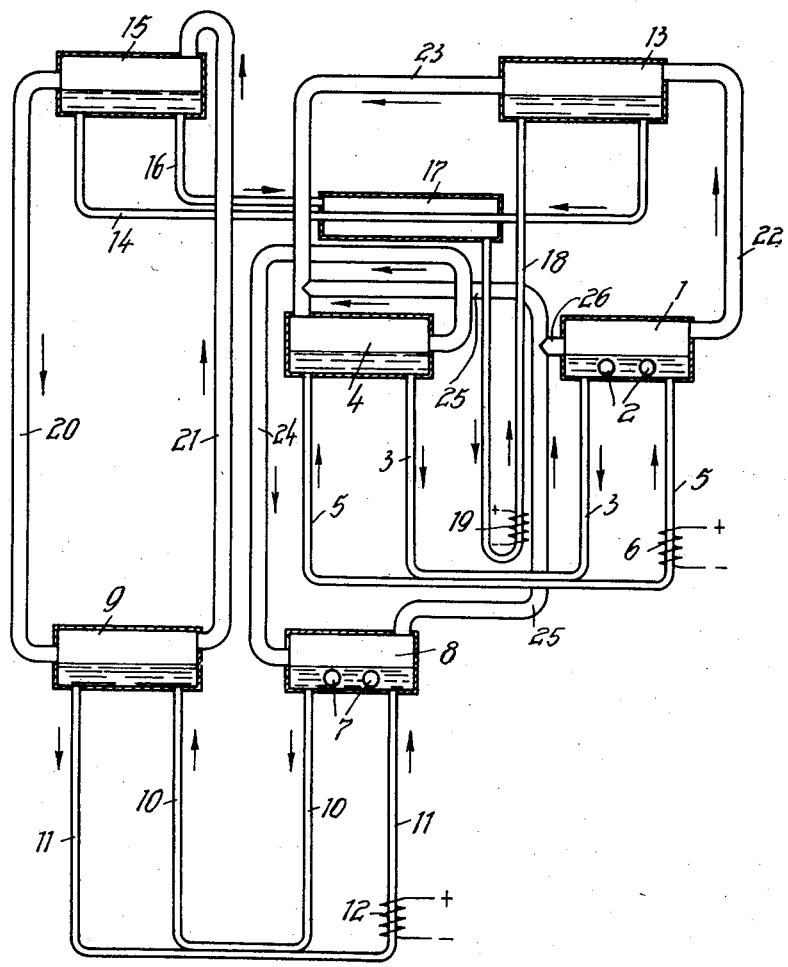

Patented Nov. 15, 1932

REISSUED 1,887,909

UNITED STATES PATENT OFFICE

EDMUND ALTENKIRCH, OF NEUENHAGEN, NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION MACHINE

Original application filed June 8, 1929, Serial No. 369,358, and in Germany June 16, 1928. Divided and this application filed October 9, 1930. Serial No. 487,465.

My invention relates to absorption machines.

It is known in the art to construct continuously operating absorption machines, particularly absorption refrigerating machines in such a manner that the differences of pressure between the evaporator and the absorber on the one hand and between the generator and the condenser or resorber on the other hand are more or less equalized by admixing a neutral gas to the gaseous working medium in the evaporator and absorber. In the known absorption machines the absorption solutions as well as the admixed neutral gas are circulated in closed circuits. The present application is a division of my co-pending application for patent Serial No. 369,358, filed June 8, 1929, and its subject matter relates more particularly to an absorption machine of the kind mentioned at the beginning, in which the gaseous working medium development in a generator is again absorbed in a resorber by an absorption solution and is evaporated in an evaporator from the absorption solution, but, in which in contrast to the hitherto known absorption machines of that kind, the development of the gaseous working medium in the generator also takes place—at least partly—in the presence of a neutral gas. Now the absorption solution circulating through the resorber and the evaporator belongs to another range of concentration than the absorption solution circulating through the generator and absorber. The difference between the present invention and the known absorption machines with admixture of a neutral gas may, therefore, be expressed as follows: Whilst in the known absorption machines the absorption solution from which the gaseous working medium evaporates into the neutral gas has a different concentration or is within a different range of concentration than the absorption solution by which the working medium is absorbed out of the gas mixture, the absorption mixture is according to my invention in both cases within the same range of concentration. But the range of temperatures and the partial pressure zone, in which the development of the gaseous working medium in the generator from the absorption solution into the neutral gas and its absorption from the gas mixture takes place, are different from one another. The advantage obtained by the admixture of neutral gas in the generator, is in the first place as follows: As it can easily be arranged that in the mixture of gaseous working medium and neutral gas entering the generator the partial pressure of the gaseous working medium is very low, it becomes possible to obtain by such means a particularly extensive de-gasification of the absorption solution in the generator, and without having to raise the final temperature of the generator as high as is necessary with generators without an admixture of gas. The extensive de-gasification of the absorption solution is of great importance for a good absorbing action in the absorber. The reduction of the final temperature of the generator is again useful on account of the danger of decomposition of the gaseous working medium (e. g. ammonia) at high temperatures, such as are ordinarily necessary particularly with air-cooled absorption machines.

The useful effect obtained by admixing an indifferent gas in the generator manifests itself particularly, when the generator together with one or several other vessels of the absorption machine, in which gaseous working medium is absorbed by an absorption solution, forms a circulation system for the indifferent gas or for the mixture of indifferent gas with the gaseous working medium. The resorber is the first vessel to come into consideration to form part of this gas-circulation system. If, however, several generators and several absorbers are employed, a generator and an absorber may be connected together to form a circulation system for gas mixture. It is also possible to connect one or more generators with a resorber and one or more absorbers as to form a common system for the circulation of gas mixture. The effect is particularly strong, if the gas mixture is made to circulate in counterflow to the absorption solution, so that, for instance, the gas mixture deprived as much as possible of gaseous working medium in the resorber is first brought into contact with the absorption solution leaving the absorber.

The circulation of the gas mixture between the generator and the absorber or between the generator and the resorber, may easily be brought about by the upward pressure produced by the heating in the generator. To facilitate this circulation, the absorber and the resorber are disposed at a higher level than the generator and as an indifferent gas for admixing, particularly a gas heavier than the gaseous working medium should be employed.

Further details, possibilities of construction and advantages of the invention are contained in the following description, and in the accompanying drawings, which illustrate the invention, in part schematically, and partly in a form approaching the actual construction. From all figures of the drawings will be seen the manner in which the individual vessels are connected with one another by means of a liquid piping and gas piping. The arrowed dash-dot lines represent gas mixture circuits, the arrowed continuous lines represent liquid circuits.

Fig. 1 is the diagram of an absorption machine, in which an absorber and an evaporator are connected with one another to form a gas-mixture circulation system, and a generator and a resorber to form another gas-mixture circulation system, and in which the circulation of the absorption solution of the one range of concentration leads through the generator and the absorber and that of the other range of concentration through the resorber and the evaporator.

Figure 1:
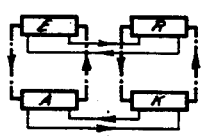
Figure 5:

Fig. 5 is the diagram of an absorption machine suitable for the production of heat at a high temperature, with one generator, one absorber, one resorber and one evaporator, i. e. with the same constituent parts as in Fig. 1, but in which all the vessels are on the one hand connected with one another to form a single liquid circulation system and on the other hand to form a single, closed gas-mixture circuit.

Figure 2:
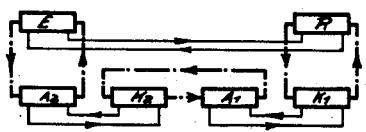
Fig. 2 is the diagram of an absorption refrigerating machine, in which a generator and a resorber, a second generator and an absorber and a second absorber and an evaporator are connected together respectively in pairs, each of the pairs mentioned forming a gas mixture circulation system.
Figure 6:
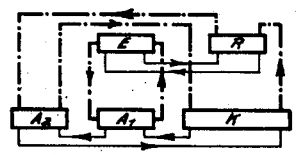

Fig. 6 is the diagram of an absorption refrigerating machine with one generator, two absorbers, one resorber and one evaporator, in which the generator is connected with the resorber and one of the two absorbers on the one hand, and the other absorber with the evaporator on the other hand, in such a manner that each of the groups forms a closed gas-mixture circulation system, and Fig. 7 shows the absorption refrigerating machine, represented diagrammatically in Fig. 2. It illustrates the arrangement of the various vessels and connecting pipes substantially in the form of a practical apparatus.

The essence of the invention is simple to explain with reference to the schematic Fig. 1. In that figure the generator is indicated by K, the absorber by A, the resorber by R and the evaporator by E. The liquid circulation systems are indicated by thin lines, and gas mixture circulation systems by thicker dot-and-dash lines. The direction of circulation is shown by arrows. Let us assume, for example, that the solvent consists of sulphuric acid, the working medium of water, the neutral gas in the generator and resorber of nitrogen, and that in the evaporator and absorber of hydrogen, and further that the sulphuric acid solution, deprived of water to a great extent, flowing from the generator K to the absorber A exchanges its heat with the solution enriched with working medium and flowing from the absorber to the generator. We also assume that the very watery solution, flowing from the resorber to the evaporator exchanges heat with the solution coming back from the evaporator to the resorber. For simplicity, the heat exchange has not been indicated in the drawings; but might be inferred from the close proximity of the pertaining lines.

The absorption machine schematically illustrated in Fig. 1 operates as follows:

When heat is imparted to the aqueous sulphuric acid solution in the generator K, steam develops into the admixed nitrogen. The sulphuric acid, which has become more concentrated owing to the evaporation of water, then passes into the absorber A. The gas mixture containing nitrogen becomes heated through coming into contact with the absorption solution in the generator K and also becomes lighter owing to the steam it now contains. It therefore rises into the resorber R where it gives up to the sulphuric acid solution coming from the evaporator E the steam which it took from the generator. The absorption heat produced is carried off by cooling water or air. The gas mixture more or less deprived of steam returns to the generator K, whereas the sulphuric acid, weakened by the water it has taken up, passes into the evaporator E, where it gives up to the admixed hydrogen the steam it contains and thereby produces useful refrigeration. In doing so the gas mixture becomes heavier and descends into the absorber A, where the steam is absorbed by the concentrated sulphuric acid coming from the generator K; the heat produced thereby being here also carried away by cooling water or air. The gas mixture which is now freed from steam and has been heated in the absorber rises again into the evaporator. In all vessels, the absorption solution and the gas mixture flow, as shown by arrows, in counterflow to each other.

The total pressure in the two gas circulation systems may be different, or may be the same. If it is different, the difference of pressure is maintained in a known manner, for instance, by means of liquid columns. For example in case of an underpressure in the absorber the latter would be placed higher than the generator, and if there is an underpressure in the evaporator, it would be placed higher than the resorber.

It simplifies matters, if in the different gas-mixture circulation systems neutral gas of the same kind is used for admixing, and the total pressure is maintained at an equal value in both systems. It is also in this case possible to produce without difficulty by known means the circulation of the gas mixture in each of the two systems.

The gaseous working medium is absorbed in the resorber from the gas mixture by the solution at a partial pressure corresponding to the temperature of the cooling means. From the solution it again evaporates into neutral gas in the same range of concentration in a zone of a lower partial pressure. It has hitherto been assumed that the gaseous working means is developed in the generator at a pressure corresponding to the partial pressure of the resorber and was fed to the neutral gas. The invention however gains considerably in importance if in the absorption machine a third (higher) pressure zone or partial pressure zone is provided, in which gaseous working medium is developed and liquefied, the latter for instance through absorption in a resorber. This zone of highest pressure may be used with or without indifferent gas.

The arrangement of the third zone of higher pressure permits a considerable reduction of the heat supplied to absorption machines, which are to produce cold. This reduction is, for instance, of advantage where the absorption machine is operated with waste heat, and where low useful temperatures are required in spite of the reduced heat supply.

With the assumption that gaseous working medium is generated in the presence of an indifferent gas, this problem may be solved by making the partial pressure, at which the working medium evaporates from the solution of the same range of concentration into the indifferent gas, higher than the partial pressure at which the gaseous working medium is absorbed by this solution from the gas mixture, but at the same time lower than the pressure at which the liquefying or resorption preceding the evaporation or de-gasification takes place in the circulation of the working medium. This case is illustrated in Fig. 2 of the drawings, in which by way of example indifferent gas is also admixed in the zone of highest pressure. The generation and absorption of the gaseous working medium, therefore, takes place here in two separate pressure stages. For this purpose, besides an evaporator E and a resorber R, two generators $K_1$ and $K_2$ as well as two absorbers $A_1$ and $A_2$ are provided. With this arrangement, it is made possible for the working medium generated in the generator $K_2$ in the medium partial pressure zone, instead of going into a condenser or resorber, to pass into the absorber $A_1$ through the agency of the indifferent gas, into which it was developed when being generated. In the absorber $A_1$ it is reabsorbed in presence of indifferent gas at a medium temperature and a medium partial pressure. As the partial pressure in the absorber $A_1$ corresponds to the partial pressure in the generator $K_2$ and is, therefore, considerably higher than in the absorber $A_2$ (which is connected with the generator $K_2$ so as to form a liquid circulation system, and the partial pressure of which corresponds to the partial pressure in the evaporator E), the solution in $A_1$ will be considerably more enriched with working medium.

Consequently, the temperature in the generator $K_1$ operating at a still higher partial pressure can be considerably reduced, without impairing the obtainable temperature of the refrigeration output. In the example, upon which Fig. 2 is based, there are three circuits of absorption solutions, in which according to the invention gaseous working medium is developed from an absorption solution within a range of temperatures and a partial pressure zone into an indifferent gas, and is reabsorbed by an absorption solution of the same range of concentration from a mixture of indifferent gas and gaseous working medium within another range of temperature and another partial pressure zone. This takes place in the circuit between the generator $K_1$ and the absorber $A_1$ as well as between the generator $K_2$ and the absorber $A_2$ and finally between the resorber R and the evaporator E.

If the object of the plant is not to produce cold, but heat of high temperature, then a considerably higher temperature of the heat output can be obtained with the last arrangement described above, than with the devices hitherto known. It is only important that there should be a generator, in which the partial pressure, at which the gaseous working medium is developed from the solution of the same concentration range into the indifferent gas, is higher than the partial pressure at which the working medium is absorbed from the gas mixture by the solution, but is at the same time lower than the pressure or partial pressure, at which the liquefying or resorption preceding the evaporation or de-gasification takes place in the working medium circuit. An arrangement of this kind is schematically illustrated in Fig. 5, and will be described later.

Figure 3:
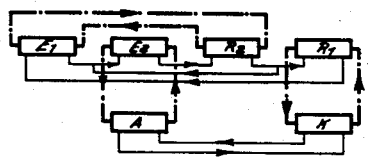
Fig. 3 is a diagram of an absorption refrigerating machine with a generator, an absorber, two resorbers and two evaporators, in which one of the resorbers is connected with the generator, the other resorber with one of the two evaporators, and the other evaporator with the absorber, in such a manner as to form three circulation systems for the gas mixture.

Fig. 3 shows an example of an absorption refrigerating machine, in which the generator is connected with a resorber, a second resorber with an evaporator, and a second evaporator with the absorber, in such a manner that in each case a closed gas-mixture circuit is formed. The liquid circuits between the two resorbers and the pertaining evaporators are here connected with one another in such a manner, that the absorption solution circulating between two temperature ranges, or at least a part of this solution, passes through all the three partial pressure zones. Let us assume that in the example schematically illustrated by Fig. 3 the working medium consists of amonia, the solvent of water, and the indifferent gas in all the three gas-mixture circuits of nitrogen. The gas-mixture circulation systems may be provided with interconnections by means of which the total pressure in all the systems are brought to the same value. These interconnections are for simplicity not shown in Fig. 3. The ammonia developed in the generator K through outside heat supply at a high temperature, passes by means of a gas-mixture circuit into the resorber R. In the latter the ammonia is absorbed by an absorption solution, which passes in the first place into the evaporator $E_1$, which in turn is connected with the resorber $R_2$ throgh a gas-mixture circuit.

The ammonia which has assumed the form of gas in the evaporator $E_1$ is re-absorbed by the solution flowing through the resorber $R_2$. This solution is in a condition to do so, since from the evaporator $E_1$ it passes into the evaporator $E_2$ where, at a low partial pressure of the ammonia, it is deprived of gas to a great extent by circulation of gas-mixture which leads through the absorber A so that the solution enters the resorber $R_2$ at a comparatively weak concentration. From the resorber $R_2$, the solution returns into the resorber $R_1$, where it obtains under the partial pressure produced in the generator K, the strong concentration of ammonia, which enables it to produce cold, already in the evaporator $E_1$ at the same medium partial pressure also prevailing in the resorber $R_2$.

In the entire absorption machine a considerably lower total pressure may prevail as a result of the admixture of the indifferent gas in all chambers, than would correspond to the vapor pressure of the pure ammonia. If a high total pressure is, however, applied in the absorption machine, it may be necessary to maintain the quantity of the solution, circulating between the resorber $R_1$ and the evaporator $E_1$ smaller than the quantity of the solution, circulating between the resorber $R_2$ and the evaporator $E_2$. The manner in which this may be simply done is shown in Fig. 3, namely by means of a shunt running from the liquid pipe connecting the vessels $R_2$ and $R_1$ to the liquid pipe connecting $E_1$ and $E_2$. By means of this shunt it is possible to return a portion of the absorption solution into the evaporator $E_2$ already when it leaves the resorber $R_2$, whereas the other portion of the solution traverses besides the said two vessels also the resorber $R_1$ and the de-gasifier $E_1$.

Figure 4:
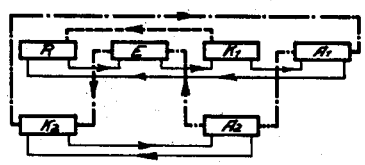
Fig. 4 is the diagram of an absorption refrigerating machine with two generators, two absorbers, one resorber and one evaporator in which the evaporator is connected with one of the two generators and with both absorbers so as to constitute a common gas-mixture circulation system, while the resorber and the other generator are free of indifferent gas.

By combining several liquid circulating circuits it is possible to go still further, for instance, by providing similarly as for the arrangement according to Fig. 2, two absorbers with separate liquid circulating circuits, but by combining in this case the liquid circulating circuit of one of the absorber systems with the liquid circulating circuit of the resorber system. Such a case is illustrated in Fig. 4. A liquid circulating circuit connects here the generator $K_2$ of the medium partial pressure zone to the absorber $A_2$ of the lowest partial pressure zone, whereas a second liquid circulating circuit traverses the generator $K_1$ of the highest pressure zone, the evaporator E, the resorber R and the absorber $A_1$ of the medium partial pressure zone. In th's case the quantity of the solution circulating in the resorber system (resorber R and evaporator E) must agree with the quantity of the absorption solution which circulates in one of the two absorber systems (absorber $A_1$ and generator $K_1$) between the medium partial pressure zone and the higher pressure zone. It is thus possible to deliver the weakened solution, coming from the evaporator directly to the generator, by inserting one or several heat exchangers and by supplying the resorber with the absorption liquid which comes from the absorber $A_1$ operating at a medium partial pressure, whereas the circulation of the solution between the generator $K_2$ working at a medium part'al pressure and the absorber $A_2$ working at a low partial pressure remains separated. It is thus feasible to largely adapt the different natures of the circulating quantities to the working conditions in a simple manner.

In the case of absorption refrigerating machine, shown schematically in Fig. 4, no indifferent gas has been admixed to the higher pressure zone in the generator $K_1$ as well as to the gaseous working medium in the resorber R. This is necessary only for the other vessels, which partake in the common closed gas mixture circuit. They include for the lowest partial pressure zone the evaporator E and absorber $A_2$, and for the medium partial pressure zone generator $K_2$ and absorber $A_1$. This gas mixture circuit is traceable from absorber $A_2$ to the circuit, which is traceable from the absorber $A_2$ to the evaporator E, from there to the generator $K_2$ and finally through the absorber $A_1$ back to the absorber $A_2$. The absorption solution flows, as the direction of the arrows shows, in the range of the stronger concentration, from resorber R.into evaporator E, from there into the generator $K_1$, then into absorber $A_1$ and finally back into resorber R. A perfect operation of this absorption refrigerating machine presupposes, as a matter of course, a good exchange of heat between the absorption solutions as well as between the gas mixtures, which circulate between the warm and cold parts of the machine.

The greatest simplicity of the liquid circulation as well as of the gas mixture circulation is obtained by combining all individual closed liquid circuits in the absorption machine to a single common closed liquid circuit, and likewise all individual closed gas mixture circuits to a single common closed gas mixture circuit. An absorption machine of this kind which is utilized for the production of heat of a higher temperature from heat supplied at a lower temperature and in which all changes of the condition of aggregation are brought about is represented in Fig. 5. The heat supplied from outside is transmitted here at a mean temperature to the generator K and to the evaporator E. The absorption solution, deprived of the driving medium flows, as the arrows show, at first into the resorber R and is there brought together with the gas mixture which is enriched by gaseous working medium in the generator K. By the absorption of the working medium from the gas mixture in the resorber R, heat of high temperature is produced which can be delivered to the outside for useful purposes. The gas mixture in the resorber R, partially freed of the working medium passes now into the absorber A, cooled down by low temperatures, where, in a low partial pressure zone of the working medium, the solution enriched by the working medium in the resorber R, will be still further enriched from the gas mixture. The solution is then returned at a mean temperature to the generator K for the purpose of renewed development of a gaseous working medium. The gas mixture in the absorber A, freed to a great extent of the working medium passes into the evaporator E, and through the heat of a mean temperature brings about a thorough degassing of the absorption solution in the latter. The greatly impoverished absorption solution will be thereby capable when reaching resorber R, to absorb therein working medium from the rich gas mixture supplied from generator K, and develop heat (heat withdrawal) as far down as the middle partial pressure.

In order that a comparatively great amount of heat of high temperature may be produced with the least possible extraction of heat at low temperature supplied from outside it is indispensable that the liquid as well as the gas mixture from closed circuits, wherever necessary, that they exchange heat with one another and that they be dimensioned properly with regard to their quantities as required for the various concentration ranges and partial pressure zones.

Fig. 6 shows schematically an absorption refrigerating machine, in which the two closed liquid circuits, which run separately in the two absorber systems according to the arrangement of Fig. 2, and one of which includes the range of the mean temperature of the heat supply, and the other the range of the high temperature of the heat supply, are combined in Fig. 6 to a common liquid circulating circuit, which passes through the generator and both absorbers.

In the same manner the two gas mixture circuits appertaining to the above-mentioned temperature ranges, and which in Fig. 2 form independent closed circuits, are in Fig. 6 also combined to a common gas mixture circulating circuit, whereas the gas mixture circulating circuit between the medium and the low temperature range remains separate. The absorber $A_1$ in Fig. 6 which is connected to the evaporator E by means of the aforementioned separate gas mixture circulating circuit is arranged independent from the absorber $A_2$ which is connected on its part by means of a gas mixture circulating circuit to the extended generator K and the resorber R. A physical separation of both absorption chambers is of course necessary.

A number of the gas mixture circulating circuits, described in the examples, run through a chamber of especially high temperature which facilitates the circulation of the gas mixture. This is particularly true for the generator of the higher partial pressure zone in absorption refrigerating machines, and for the resorbers in absorption machines, in which heat is produced. Care should be taken, by means of a convenient arrangement of a heat exchanger between the gas mixture flowing to the generator or the resorber and gas mixture flowing from the generator or the resorber, not to have valuable heat carried off or to destroy the cold. It should, however, be observed, that, with the majority of the gas mixture circulating circuits disclosed, the partial pressure range, which they traverse in two or three different pressure zones, is so considerable, that the quantity of the circulating gas involved may be comparatively insignificant. For this reason a heat exchanger between the circulating gas mixture may be dispensed with in many cases without considerable loss. The same applies also to the circulation of the absorption solution between the various temperature ranges.

For the circulation of the absorption solution various means can be employed, all of which are well known for similar purposes. If for instance the pressure in the chambers, where working medium under high pressure is absorbed from the gas mixture, is higher than in the chambers of the same liquid circulating system, where gaseous working medium is developed out of the absorption solution into the neutral gas, this difference of pressure can be maintained by means of liquid columns (columns of flowing absorption solution) and a liquid circulating circuit is then established by itself as a result of the different specific weights of the rich and of the poor solution. In cases in which the several gas mixture circulating circuits are combined to a common circulating system it is not possible to maintain such a difference of pressure. In order to bring about the desired liquid circulation the different vessels should then be connected one to another by means of a pipe system, say by U-pipes which contain also the heat exchanger, in which latter takes place the reciprocal effect of the indifferent gas with the absorption solution, and the circulation should be brought about by heating the solution in the rising limb of the corresponding U-pipe, which carries the solution for instance into the chamber, which belongs to the higher temperature range. An example of this type of liquid circulation is given in the arrangement according to Fig. 7, which will be explained in the following.

The absorption machine shown in Fig. 7 is an absorption refrigerating machine of a type, schematically illustrated in Fig. 2. Similar to Fig. 2, an evaporator and a resorber are provided, and two generators and two absorbers. The evaporator forms with the resorber a liquid circulating system for the absorption solution of the higher concentration range. Each of the two generators forms with its respective absorber likewise a liquid circulating system for the absorption solution of lower concentration range. The evaporator is connected to one of the two absorbers so as to form a gas mixture circulating system. A second gas mixture circulating system is provided between the other absorber and one of the two generators, and a third gas mixture circulating between the other generator and the resorber. 1 is the generator of the highest partial pressure zone, heated by two heating elements 2. It is of the horizontal type as all other vessels and the inlets for the absorption liquid on the one hand and the gas mixture on the other hand are so arranged in relation to one another, that a counter current of gas mixture and absorption results. The same applies also to all other vessels in which reciprocal effect takes place between gas mixture and absorption solution. The absorption solution flows from the generator 1 through a U-shaped bent liquid pipe 3 into absorber 4 of the medium partial pressure zone and thence it flows back into the generator 1 by means of a liquid pipe 5 which is in an exchange of heat with the pipe 3. The circulation of the absorption is caused by a heating element 6 arranged in the lower part of the rising limb of the pipe 5. The heating element can be connected to an electrical source of energy, for instance to a direct current supply.

In a corresponding manner as the vessels 1 and 4, the generator 8 of the medium partial pressure zone, also heated by heating elements 7 and the absorber 9 of the low partial pressure zone are connected by means of the liquid pipes 10 and 11, which are in an exchange of heat with one another. 12 denotes here also a heating element, arranged on the rising limb of the U-shaped bent liquid pipe 11. From the resorber 13 the absorption liquid flows through a liquid pipe 14 into the evaporator 15 and thence through the liquid pipe 16, 17, 18 back to the resorber 13. The pipe 16, 17, 18 is enlarged in its middle part 17 to a vessel, which surrounds the pipe 14 and forms with the latter a heat exchanger. The part 18 of the liquid pipe which returns the solution from vessel 17 to the resorber 13, forms a U-pipe in the rising limb of which the absorption solution can be heated by means of a heating element 19. The absorber 9 is connected to the evaporator by the gas pipes 20 and 21. The inlets of these pipes into the gas chamber of the vessels 9 and 15 are placed in such a manner that, when selecting an indifferent gas (for instance hydrogen) which is lighter than the gaseous working medium (for instance ammonia), an automatic gas mixture circulating circuit must be brought about as a result of the difference in the molecular weights and as a result of the changes of the specific weight of the gas columns, caused by the difference in temperature. The generator 1 is connected to the resorber 13 by means of a gas pipe 22, which delivers the gas mixture, enriched with gaseous working medium, to the resorber.

For carrying off the indifferent gas from the resorber 13, a gas pipe 23 is provided which ends at the top of absorber 4. From the absorber 4 a gas pipe 24 runs to the generator 8 and from this generator a gas pipe 25 runs to the top of absorber 4, where it joins the aforementioned gas pipe 23. A further gas pipe 26, which branches off from the pipe 25, connects with generator 1. It is assumed that in the gas mixture circulating system, to which belong the vessels 1, 4, 8, 13 and the gas pipes 22—26, is contained an indifferent gas which is heavier than ammonia vapour. The gas mixture in the vessels 1 and 8, in which the ammonia vapour is developed and admixed to the indifferent gas, will be lighter than in the vessels of these circuits, in which it is deprived of the greater part of ammonia by absorption. Moreover since vessels 1 and 8 lie in the highest range of temperature of the absorption machine, the rising of the gas mixture to the higher situated resorber 13 or absorber 4 will be favoured by the heating which the gas mixture experiences. The gas current which flows upward through the pipe 25 is divided into two parts. One part flows through the pipe 26 to the generator 1, pipe 22 and resorber 13 the pipe 23, into the other part flows directly to absorber 4, at the top of which it again joins the part flowing through pipe 23. In this manner a greater amount of gas mixture circulates through the vessels 4 and 8 than through the vessels 1 and 13.

Besides this particular illustrated example of a combination of several mixture cycles, a number of other modifications of the invention possible in this respect, and which refer to the combination of several closed gas mixture circuits into a common gas mixture circulating system.

It can for instance also be of advantage in the case of an absorption refrigerating machine—which possesses, as illustrated in Fig. 4, two generators and two absorbers but only one evaporator and one resorber— to combine the generator of the highest pressure stage, operating without admixture of the indifferent gas (such as $K_1$ in Fig. 4) with the second generator and both absorbers to a liquid circulating system, which is completely separated from the liquid circulating circuit, in which liquid of the other concentration range circulates. In this case it is possible to form in a convenient manner two gas mixture circulating circuits, separated one from another, of which one connects the evaporator and one of the two absorbers with one another in the low partial pressure zone, whereas the other includes both absorbers as well as the generator of the middle partial pressure zone.

If in the above mentioned examples three ranges of temperature are involved, between which the absorption solutions or gas mixtures circulate, the systems according to the invention are not, however, limited thereto.

As it is possible without difficulty for two different evaporator temperatures or two entirely different generator temperatures of the heat abstraction to coexist, other ranges of temperature can be easily added to those already described, in which a reciprocal effect takes place between the absorption and the gas mixture. This improvement may be under certain circumstances of great importance if, for instance, by adding the third pressure zone the normal evaporator temperature is too low but a portion of the cold may be produced at a somewhat lower temperature.

Such is the case for instance with a domestic refrigerator where the cooling of the cooling chamber occurs a temperature of 2 to 4 centigrades above zero, but where a temperature of at least 5 centigrades below zero must be produced in the evaporator for the production of ice. One evaporator can be then operated for instance at a temperature of 8 centigrades below zero, the other at a temperature of zero centigrade. In this case therefore we deal with four ranges of temperature.

If it is, however, of importance to lower the temperature slightly for the production of cold or to considerably reduce the generator temperature, the intended effect may be obtained by adding another pressure or partial pressure zones so fas as it lies within the limits of possibility, which are fixed by the physical properties of the absorption solutions.

I claim as my invention:

1. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium into absorption solution of a second concentration range, an evaporator for evaporating working medium from the absorption solution of the second concentration range, an absorber for absorbing evaporated gaseous medium to form absorption solution of the first concentration range, pipes connecting the aforementioned elements to form a closed circulation system for said working medium, connecting pipes between the generator system and said absorber to permit circulation of the absorption solution of the first concentration range, connecting pipes between the resorber system and said evaporator to permit circulation of the absorption solution of the second concentration range, the evaporation of working medium in the evaporator, and the absorption of gaseous medium in the absorber occurring in the presence of said indifferent gas, the development of gaseous medium from absorption solution of the first concentration range occurring in at least a portion of the generator system in the presence of indifferent gas.

2. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing evaporated gaseous medium to form absorption solution of the first concentration range, pipes connecting the individual parts of the absorption machine to form a closed circulation system for said working medium, connecting pipes between said generator system and said absorber to permit circulation of the absorption solution of the first concentration range, connecting pipes between the said resorber system and said evaporator to permit circulation of the absorption solution of the second concentration range, the evaporation of working medium in the evaporator and the absorption of gaseous medium in the absorber occurring in the presence of said indifferent gas, the development of gaseous medium from absorption solution of the first concentration range in the generator system occurring in the presence of indifferent gas, and connecting pipes between at least a portion of the generator system and at least a portion of said resorber system to render possible circulation of the indifferent gas through a generator and a resorber.

3. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing evaporated gaseous medium to form absorption solution of the first concentration range, pipes connecting the individual parts of the absorption machine to form a closed circulation system for said working medium, connecting pipes between said generator system and said absorber to form a closed circulating system for the absorption solution of the first concentration range, connecting pipes between the said resorber system and said evaporator to form a circulating system for the absorption solution of the second concentration range, the evaporation of working medium in said evaporator, and the absorption of gaseous medium in said absorber occurring in the presence of said indifferent gas, the development of gaseous medium from absorption solution of the first concentration range in at least a part of said generator system occurring in the presence of indifferent gas, and connecting pipes between that part of said generator system and said absorber to permit circulation of the indifferent gas through said part of the generator system and the absorber.

4. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing said evaporated gaseous medium to form absorption solution of the first concentration range, pipes connecting the individual parts of the absorption machine to form a closed circulation system for said working medium, connecting pipes between said generator system and said absorber to permit circulation of the absorption solution of the first concentration range, connecting pipes between said resorber system and said evaporator to permit circulation of the absorption solution of the second concentration range, the evaporation of working medium in said evaporator and the absorption of gaseous medium in said absorber occurring in the presence of said indifferent gas, the development of gaseous medium from absorption solution of the first concentration range in at least a part of said generator system occurring in the presence of indifferent gas, and connecting pipes between said part of the generator system, said resorber and said absorber to render possible a circulation of the indifferent gas through said generator part, said resorber and said absorber.

5. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing evaporated gaseous medium to form absorption solution of the first concentration range, pipes connecting the individual parts of the absorption machine to form a closed circulation system for said working medium, connecting pipes between said generator system and said absorber to permit circulation of the absorption solution of the first concentration range, connecting pipes between said resorber system and said evaporator to permit circulation of the absorption solution of the second concentration range, the evaporation of working medium in the evaporator, and the absorption of gaseous medium in the absorber occurring in the presence of said indifferent gas, the development of gaseous medium from absorption solution of the first concentration range in at least a part of said generator system occurring in the presence of indifferent gas, and connecting pipes between said part of the generator system, said resorber system, said evaporator and said absorber for establishing a uniform circulation of the indifferent gas through said vessels.

6. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing said evaporated gaseous medium to form absorption solution of the first concentration range, pipes connecting individual parts of the absorption machine to form a closed circulating system for the said working medium, connecting pipes between said generator system and said absorber to permit circulation of the absorption solution of the first concentration range, connecting pipes between said resorber system and said evaporator to permit circulation of the absorption solution of the second concentration range, the evaporation of working medium in the evaporator, and the absorption of gaseous medium in the absorber occurring in the presence of said indifferent gas, the development of gaseous medium from absorption solution of the first concentration range in at least one generator of said system occurring in the presence of indifferent gas, connecting pipes between said generator, said resorber system and said absorber to form a circulating system for the indifferent gas through aforesaid elements, said generator system having a second generator free of indifferent gas, and connected in the path of circulation of absorption solution of the first concentration range.

7. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing developed gaseous medium in absorption solution of a second concentration range, an evaporator for evaporating working medium from the absorption solution of the second concentration range, an absorber for absorbing evaporated gaseous medium in absorption solution of the first concentration range, pipes connecting the aforesaid parts to form a closed circulation system for said working medium, connecting pipes between said generator system and said absorber to permit circulation of the absorption solution of the first concentration range, connecting pipes between the said resorber system and said evaporator to permit circulation of the absorption solution of the second concentration range, the evaporation of gaseous medium in the evaporator and the absorption of gaseous medium in the absorber occurring in the presence of said indifferent gas, the development of gaseous medium from absorption solution of the first concentration range in at least a portion of said generating system occurring in the presence of indifferent gas, the development of gaseous medium in the generator system and its conversion into a more dense fluid phase occurring at a partial pressure higher than the partial pressures of the gaseous working medium in the other vessels.

8. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing the developed gaseous medium in absorption solution of a second concentration range, an evaporator for evaporating working medium from the absorption solution of the second concentration range, an absorber for absorbing evaporated gaseous medium in absorption solution of the first concentration range, pipes connecting the aforementioned parts to form a closed circulation system for the said working medium, connecting pipes between said generator system and said absorber to permit circulation of the absorption solution of the first concentration range, connecting pipes between the said resorber system and said evaporator to permit circulation of the absorption solution of the second concentration range, the evaporation of working medium in the evaporator and the absorption of gaseous medium in the absorber occurring in the presence of said indifferent gas, the development of gaseous medium from absorption solution of the first concentration range in at least a portion of said generator system occurring in the presence of indifferent gas, the development of gaseous medium in the generator system, and its conversion into a more dense fluid phase occurring at a partial pressure higher than the partial pressures of the gaseous working medium in the other vessels, and said gas development occurring at a higher temperature than the gas development and absorption in the other vessels.

9. An absorption machine having a generator for developing gaseous working medium from an absorption solution of a first concentration range, an absorber for absorbing working medium by an absorption solution of the same concentration range, a second generator and a second absorber for respectively developing working medium from, and absorbing it into absorption solution of a second concentration range, an evaporator for evaporating working medium from absorption solution of a third concentration range, a resorber for absorbing said evaporated medium to form absorption solution of said third concentration range, the gaseous working medium in said generators, absorbers, evaporator and resorber having an indifferent gas admixed to it, connecting pipes between the said first generator and said resorber, connecting pipes between said second generator and said first absorber and between said second absorber and said evaporator to form gaseous mixture circuits through the vessels connected with one another.

10. An absorption machine, containing a generator and an absorber, a second generator and a second absorber, an evaporator and a resorber, said first generator being connected with said first absorber, said resorber and said evaporator so as to form a common circulation circuit for absorption solution, said second generator being connected with said second absorber to form a second circulation circuit for absorption solution, the gaseous working medium in the said two absorbers, the said second generator and the said evaporator having indifferent gas admixed to it, and connecting pipes between the said last named vessels to permit circulation of indifferent gas through them.

11. An absorption machine for the production of heat of high temperature, containing a generator, an absorber, an evaporator and a resorber, connecting pipes between said vessels to permit circulation of absorption solution through them, the gaseous working medium in said vessels having an indifferent gas admixed to it, and further connecting pipes between the said vessels to permit circulation of indifferent gas through said generator, resorber, absorber and evaporator.

12. An absorption refrigerating machine, containing a generator and an absorber, a second generator and a second absorber, an evaporator and a resorber, connecting pipes between said evaporator and resorber to permit circulation of absorption solution through said two vessels, connecting pipes between said two generators and said two absorbers to permit circulation of absorption solution through the last-named vessels, the gaseous working medium in said evaporator and in one of the two absorbers having indifferent gas admixed to it, the gaseous working medium in said second generator and in the other of the two absorbers having indifferent gas admixed to it, and connecting pipes within the two groups of vessels to establish two circuits for the gas mixture, one through said evaporator and one of said absorbers, and the other through said other absorber and said generator.

13. An absorption refrigerating machine containing a generator, a resorber, an evaporator and two absorbers, connecting pipes between said evaporator and said resorber to permit circulation of absorption solution through said last-named vessels, connecting pipes between said generator and said absorbers to permit circulation of solution through said generator and said absorber, the gaseous working medium in all said vessels having indifferent gas admixed to it, connecting pipes between said evaporator and one of said absorbers to establish circulation of indifferent gas through said last-named vessels, connecting pipes between said generator, said resorber and said other absorber to establish circulation of indifferent gas through said generator, said resorber and said absorber.

14. An absorption refrigerating machine having several different partial pressure zones in its constituent vessels and containing two generators, a resorber, an evaporator and two absorbers, one of said generators and said resorber belonging to a high partial pressure zone, and one of said absorbers and said evaporator belonging to a low partial pressure zone, while the other generator and the other absorber belong to a medium partial pressure zone, connecting pipes to permit circulation of absorption solution between said resorber and said evaporator, connecting pipes for establishing a second solution circuit including said first generator and said second absorber, and connecting pipes for establishing a third solution circuit including said second generator and said first absorber, the gaseous working medium in all of said vessels having indifferent gas admixed to it, connecting pipes between said evaporator and said first-mentioned absorber for establishing circulation of gas mixture through the lowest partial pressure zone vessels, connecting pipes between said second generator and said second absorber for establishing circulation of gas mixture through the medium partial pressure zone vessels, connecting pipes between said first generator and said resorber for establishing circulation of gas mixture through the highest partial pressure zone vessels, and an intermediate connection between the gas circulation systems of the highest and of the medium partial pressure zone, whereby the amount of mixture flowing through one zone is made different from the amount flowing through the other zone.

15. An absorption refrigerating machine, having several different partial pressure zones in its constituent vessels, and containing two generators, a resorber, an evaporator and two absorbers, one of said generators and said resorber belonging to a high partial pressure zone, and one of said absorbers and said evaporator belonging to a low partial pressure zone, while the other generator and the other absorber belong to a medium partial pressure zone, connecting pipes to permit circulation of absorption liquid btween said resorber and said evaporator, connecting pipes for establishing a second liquid circuit between said first generator and said second absorber, and connecting pipes for establishing a third liquid circuit between said second generator and said first absorber, the gaseous working medium in all of said vessels having indifferent gas admixed to it, connecting pipes between said evaporator and said first-mentioned absorber for establishing circulation of gas mixture through the lowest partial pressure zone vessels, connecting pipes between said second generator and said second absorber for establishing circulation of gas mixture between the medium partial pressure zone vessels, connecting pipes between said first generator and said resorber for establishing circulation of gas mixture between the highest partial pressure zone vessels, and an intermediate pipe connection between the gas circulation systems of the highest and the medium partial pressure zone, whereby a reciprocal action occurs between the absorption solution and the total amount of indifferent gas mixture in the medium partial pressure zone, but whereby only a portion of this total amount takes part in the reciprocal action with absorption solution in the highest partial pressure zone, including the first generator and the resorber.

16. An absorption refrigerating machine, having several different partial pressure zones in its constituent vessels, and containing two generators, a resorber, an evaporator and two absorbers, one of said generators and said resorber belonging to a high partial pressure zone, and one of the two absorbers and said evaporator belonging to a low partial pressure zone, while the other generator and the other absorber belong to a medium partial pressure zone, connecting pipes to permit circulation of absorption liquid between said resorber and said evaporator, connecting pipes for establishing a second liquid circuit between said first generator and said second absorber, and connecting pipes for establishing a third liquid circuit between said second generator and said first absorber, the gaseous working medium in all of said vessels having indifferent gas admixed to it, connecting pipes between said evaporator and said first-mentioned absorber for establishing circulation of gas mixture through the lowest partial pressure zone vessels, connecting pipes between said second generator and said second absorber for establishing circulation of gas mixture through the medium partial pressure zone vessels, connecting pipes between said first generator and said resorber for establishing circulation of gas mixture through the highest partial pressure zone vessels, and an intermediate connection between said gas circulation systems of the highest and the medium partial pressure zone, whereby the amount of mixture flowing through one zone is different from the amount flowing through the other zone, all liquid circulation pipes between the vessels of the several aforestated groups being U-shaped and disposed in heat exchanging relation to one another to circulate absorption solution between the vessel situated in a higher temperature range and the vessel situated in a lower temperature range, and a heating element in each group of pipes attached to the upwardly extending leg of the U-pipe leading to the higher temperature vessel for heating the absorption liquid in said leg.

In testimony whereof I affix my signature.

EDMUND ALTENKIRCH.